March 28, 1944.  S. B. AVERY  2,344,959
APPARATUS FOR EXTRUSION OF PLASTIC MATERIAL IN TUBULAR FORM
Filed Aug. 26, 1941
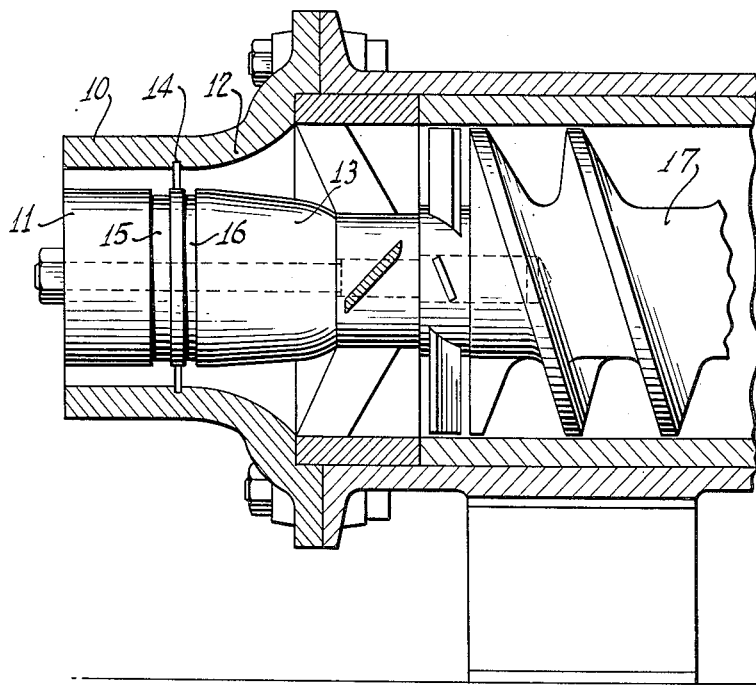
INVENTOR
STEVEN B. AVERY.
BY
ATTORNEY Patented Mar. 28, 1944

2,344,959

UNITED STATES PATENT OFFICE 2,344,959

APPARATUS FOR EXTRUSION OF PLASTIC MATERIAL IN TUBULAR FORM

Steven B. Avery, Philadelphia, Pa., assignor to The Ruberoid Co., New York, N. Y., a corporation of New Jersey Application August 26, 1941, Serial No. 408,325

4 Claims. (Cl. 25—14)

This invention relates to apparatus for the manufacture, by extrusion through a die, of pipes or tubes formed of asbestos-cement, concrete, or other suitable plastic cementitious material.

The die ordinarily comprises a nozzle, and a core centered within and spaced from the nozzle. The plastic material to be formed into a pipe or tube is extruded through the die by an auger or other equivalent device.

It has been found, particularly in the extrusion of asbestos-cement pipe, that the density of the outer and inner surfaces of the pipe vary somewhat, and that smooth surfaces are not always obtained, especially when the linear rate of flow of the material along one surface of the die is greater than along the other.

These objections appear to be due to the fact that the nozzle and the core do not exert a balanced frictional drag on the material as it is extruded through the die.

It is an object of my invention to overcome these objections by the provision of means for balancing the frictional drag of the nozzle and the core so as to obtain the same extrusion speed of the material on both surfaces.

According to this invention the frictional drag is balanced and a uniform extrusion speed of the material is attained by the provision of slots or grooves at predetermined points in the opposed surfaces of the nozzle and the core. In the operation of the apparatus, these slots or grooves become filled with the plastic material being extruded. The material caught therein hardens and exerts a frictional drag on the unhardened plastic material thereafter passing through the die. The hardened material in the slots or grooves also exerts some rubbing or polishing action on the inner and outer surfaces of the pipe. These slots or grooves may be annular, and are preferably formed in both the nozzle and the core, although in some instances, depending upon the character of the material extruded and other factors, a proper balancing may be attained by providing either the core or the nozzle with such slots or grooves. The size and area of the grooves determine the frictional drag and permit of the balancing of flow above referred to.

Other objects and advantages of the invention will appear more fully from the following description thereof, reference being had to the accompanying drawing showing a sectional view of a portion of an extrusion apparatus illustrating a preferred embodiment of the invention in the die thereof.

Referring to the drawing, 10 indicates the die-nozzle in which the cylindrical die-core 11 is centrally supported. As shown in the drawing, the inner end 12 of the nozzle flares outwardly while the inner end 13 of the core is reduced in diameter on a curve or taper to provide a gradually contracted passage that will compact and densify the plastic material as it moves toward the discharge end of the die. It will be understood, however, that either or both of these elements may be of other form and of any desired taper.

The inner surface of the nozzle is provided with a recess 14 which may be in the form of a continuous or discontinuous annular groove or slot. Similar recesses 15 and 16 are formed in the peripheral surface of the core.

The plastic material to be extruded is fed into and through the die by means of an auger 17, or equivalent device, and a portion of the material will be caught and held in the several recesses and will become hardened, or tend to become hardened therein. These entrapped masses of material form friction elements, flush with the respective surfaces, that effect a frictional drag on the material being extruded through the die.

The friction that is normally caused by the flow of the material between the opposed faces of the metal core and nozzle is increased, and is balanced, by the frictional drag effected by the hardened plastic material caught and held in the grooves 14, 15 and 16.

The size and relative arrangement of the grooves to effect the desired balance is determined empirically. The die illustrated in the drawing is designed to extrude asbestos-cement pipe of six inch diameter. With such die I have found that a satisfactory balance is attained by making the groove 14 one-quarter inch wide by one-quarter inch deep, the groove 15 three-quarters inch wide by one-quarter inch deep, and the groove 16 three-eighths inch wide by one-quarter inch deep. The groove 15 is located about three inches from the discharge end of the nozzle, and the grooves 15 and 16 are spaced apart about one-half inch. The groove 14 is preferably staggered, or out of register, as shown, with the grooves 15 and 16. It is to be understood, of course, that the location and dimensions of these grooves or recesses may be varied as required for proper balancing of the frictional drag.

The surface of the friction elements is automatically maintained flush with the surface of the die parts in which the grooves 14, 15 and 16 are formed since the material caught in said grooves is constantly replenished by the flow of the material through the die.

What I claim is:

1. A die for extrusion of pipe from plastic cementitious material, comprising a nozzle through which the material is extruded, and a core within the nozzle, said core having an annular groove on its outer surface, which groove is adapted to be filled with a portion of the cementitious material that hardens therein to provide a frictional drag for effecting a balance in the rate of extrusion of the material passing through the die.

2. A die for extrusion of pipe from plastic cementitious material, comprising a nozzle through which the plastic material is extruded, and a core within the nozzle, said nozzle having annular grooves in the opposed surfaces thereof adapted to be filled with a portion of the cementitious material that hardens therein to provide a frictional drag for effecting a balance in the rate of extrusion of the material passing through the die.

3. A die for extrusion of pipe from plastic cementitious material, comprising a nozzle through which the material is extruded, and a core within the nozzle, said nozzle and core having annular grooves in the opposed surfaces thereof adapted to be filled with a portion of the cementitious material that hardens therein to provide a frictional drag for effecting a balance in the rate of extrusion of the material passing through the die.

4. A die for extrusion of pipe from plastic cementitious material, comprising a nozzle through which the material is extruded, and a core within the nozzle, said nozzle and core having annular grooves in the opposed surfaces thereof adapted to be filled with a portion of the cementitious material that hardens therein to provide a frictional drag for effecting a balance in the rate of extrusion of the material passing through the die, the grooves in the core being out of alignment with those in the nozzle.

STEVEN B. AVERY.